United States Patent [19]

Strikis et al.

[11] Patent Number: 5,370,511

[45] Date of Patent: Dec. 6, 1994

[54] CLUTCH APPARATUS FOR A ROTARY COMPRESSOR

[75] Inventors: Guntis V. Strikis, Belleville; Vipen K. Khetarpal, Novi, both of Mich.

[73] Assignee: Ford Motor Company, Dearborn, Mich.

[21] Appl. No.: 172,781

[22] Filed: Dec. 27, 1993

[51] Int. Cl.⁵ ............................................. F01C 1/34
[52] U.S. Cl. .................................... 418/6; 418/11; 418/69; 192/84 A; 192/84 B; 192/84 R
[58] Field of Search ................. 418/6, 11, 69; 192/66, 192/84 A, 84 B, 84 R

[56] References Cited

U.S. PATENT DOCUMENTS

| | | |
|---|---|---|
| 1,008,309 | 11/1911 | Cushman . |
| 1,854,829 | 4/1932 | Doring et al. . |
| 2,787,874 | 4/1957 | Blood et al. ............... 192/84 R |
| 2,919,775 | 1/1960 | Wiedmann et al. . |
| 3,084,776 | 4/1963 | Rabinow . |
| 3,701,404 | 10/1972 | Cassell . |
| 5,015,161 | 5/1991 | Amin et al. .............. 418/6 |
| 5,107,972 | 4/1992 | Sundquist . |
| 5,135,368 | 8/1992 | Amin et al. . |

FOREIGN PATENT DOCUMENTS

| | | | |
|---|---|---|---|
| 2341208 | 2/1975 | Germany ............... | 192/84 A |
| 744943 | 2/1956 | United Kingdom . | |
| 1541447 | 2/1988 | U.S.S.R. . | |

Primary Examiner—Richard A. Bertsch
Assistant Examiner—Charles G. Freay
Attorney, Agent, or Firm—Raymond L. Coppiellie; Roger L. May

[57] ABSTRACT

A clutch apparatus for a rotary compressor for an air conditioning system is disclosed including a crankshaft, an eccentric for engaging an orbiting ring within the compressor, and a plunger disposed within the crankshaft. The apparatus further includes a device for axially reciprocating the plunger in the crankshaft so as to cause engagement and disengagement of the plunger into the eccentric whereby the crankshaft transmits torque to the eccentric to rotate the orbiting ring within the compressor.

10 Claims, 4 Drawing Sheets

CLUTCH APPARATUS FOR A ROTARY COMPRESSOR

BACKGROUND OF THE INVENTION

1. Field of the Invention

The present invention relates generally to gas compressors. More particularly, the present invention relates to a clutch assembly for a gas compressor of the type having eccentric drives.

2. Disclosure Information

A conventional rotary compressor is constructed so that a crankshaft having an eccentric part is driven in a cylinder by a motor. A rolling piston fitted to the eccentric part compresses refrigerant gas inducted into the cylinder. A compression chamber is formed inside the cylinder between its axial ends and a vane, which is slidably held in the cylinder and has an end portion contacting the outer surface of the rolling piston. Rotary compressors of this general type are well known in the art.

A scroll-type gas compressor is described in U.S. Pat. No. 4,781,549. This compressor includes symmetrical scroll members encircling one another in one wrap. The ends of the wrapped members provide continued sealing between the scroll members.

As is also well known in the art, each of these compressors includes a crankshaft drivably connected to a power source, such as the vehicle engine. Typically, an endless belt connects the crankshaft of the compressor to the automotive engine so that the crankshaft of the compressor produces torque which drives the orbiting or rotating elements of the compressor. In order to prevent continuous transmittal of torque through the compressor, friction clutches have long been proposed which selectively enable the transmission of torque from the vehicle engine to the crankshaft of the compressor. These friction clutches, typically involving an electromagnetic clutch assembly which engages the crankshaft of the compressor upon the need for air conditioning in the vehicle are well known in the art. However, these electromagnetic friction clutches are often noisy, complex and add cost and weight to the compressor. It would, therefore, be desirable to find an alternative type of clutch assembly for transmitting torque from the vehicle engine through to the orbiting elements of the compressor.

SUMMARY OF THE INVENTION

The present invention overcomes the disadvantages of the prior art by providing a clutch apparatus for a compressor of an air conditioning system in an automotive vehicle. The clutch apparatus of the present invention comprises a crankshaft drivably connected to a power source at one end thereof and defining a chamber at an opposite end thereof and an eccentric operative to engage an orbiting ring within the compressor so as to cause rotation of the ring. The eccentric is rotatable relative to the crankshaft and is slidably received in the chamber of the crankshaft. The eccentric defines a blind bore of predetermined shape at one end thereof. The clutch apparatus further includes a plunger disposed within the crankshaft, the plunger including a head portion and a shaft portion. The head portion is disposed in the chamber of the crankshaft and matingly engages the bore in the eccentric. The plunger shaft is axially reciprocal in the crankshaft. The clutch apparatus further includes means for axially reciprocating the plunger shaft in the crankshaft so as to cause engagement and disengagement of the plunger head portion into the blind bore of the eccentric. In this manner, the crankshaft transmits torque to the eccentric to rotate the orbiting ring upon engagement of the head portion into the blind bore upon actuation of said means and the crankshaft rotates freely relative to eccentric upon deactuation of the means for axially reciprocating the plunger shaft.

In one embodiment, the means for axially reciprocating the plunger shaft portion in the crankshaft includes a linkage assembly connected to the plunger shaft. The linkage assembly is operatively associated with a coil of current-carrying wire disposed in the crankshaft and electrically connected to an electrical power source such that under a current from an electrical power source in the vehicle, such as the vehicle battery, the coil causes the linkage assembly to reciprocate, which in turn causes the plunger head to axially move relative to the crankshaft to engage the blind bore of the eccentric.

It is an advantage of the present invention to provide a clutch apparatus for a rotary compressor which has simple construction, is more compact and is quieter than previously known friction drive clutches. These and other objects, features and advantages of the present invention will become apparent from the following drawings, detailed description and claims.

DETAILED DESCRIPTION OF THE PREFERRED EMBODIMENTS

The clutch apparatus of the present invention can be utilized with any type of drive mechanism for causing relative motion between a driving and driven member, the drive mechanism having an eccentric offset from the axis of its crankshaft. The present invention has particular utility in a rotary or scroll type compressor having an eccentric with an axis offset from the axis of the crankshaft, especially in the rotary compressor described in U.S. Pat. No. 5,135,368, assigned to the assignee of the present invention and to which the description of the present invention pertains. It should be apparent that the present invention is not meant to be limited solely to the rotary compressor described herein, but applies equally to other types of compressors as well.

Figure 1:
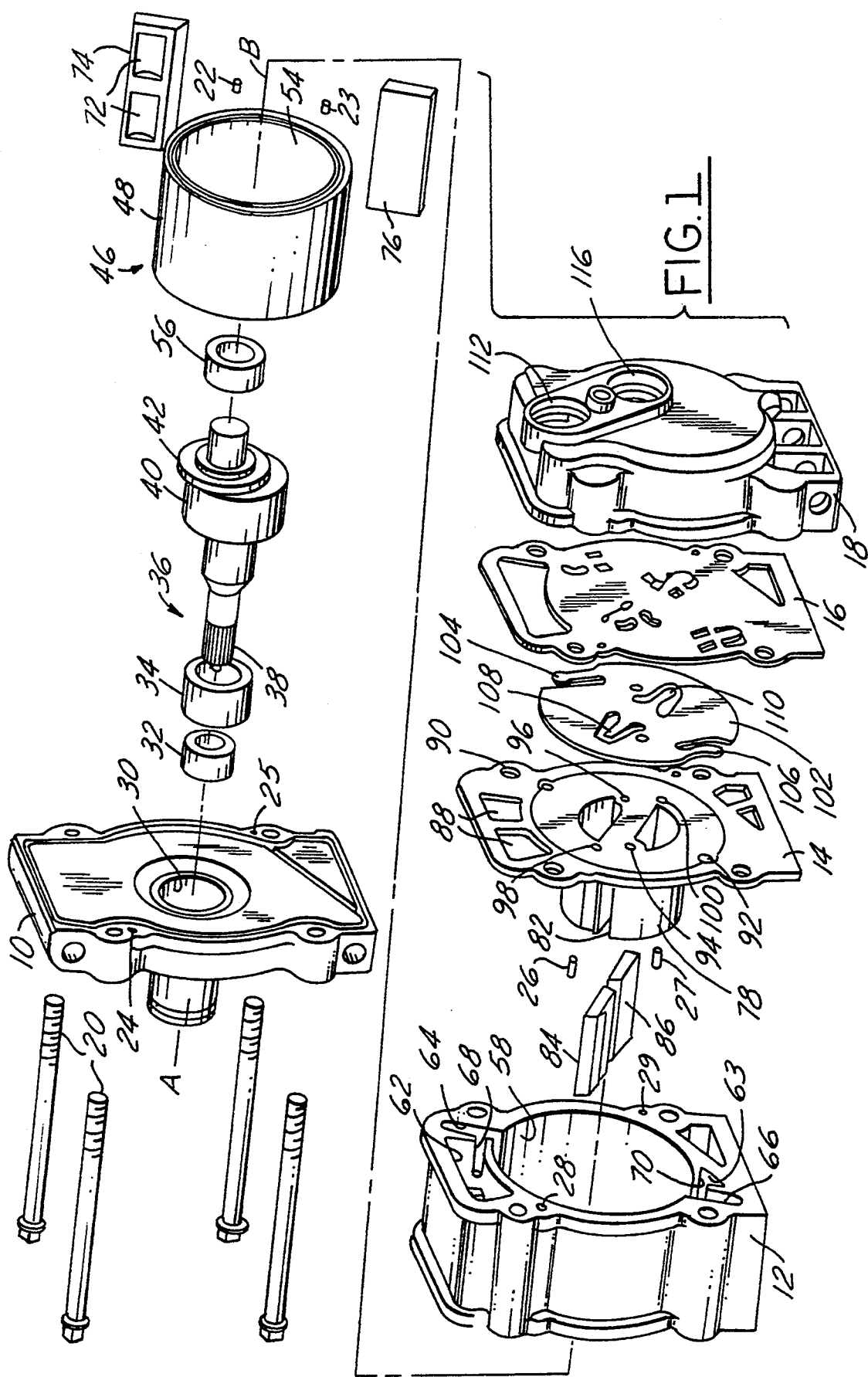
FIG. 1 is an exploded, perspective view of a compressor structured in accord with the principles of the present invention.

Referring first to FIG. 1, the housing of a gas compressor includes a front head 10, center housing 12, rear gasket 16 and rear head 18. These components and rear plate 14 are mutually connected by passing tension bolts 20 through four aligned bolt holes formed in each of the components and by engaging threads tapped in the rear head. Dowel pins 22, 23 located within alignment holes 24, 25 establish and maintain the angular position of the front head relative to the center housing. Dowel pins 26, 27 located within holes 28, 29 in the rear face of the center housing, the rear plate gasket and front face of the rear head establish and maintain the angular relative position among these components. While dowel pins are described for locating the components relative to one another, other means for locating components are well within the knowledge of one of ordinary skill in the art.

The front head includes a cylindrical bore 30 having a small diameter sized to receive a hydraulic seal 32 and a larger diameter sized to receive roller bearing 34. The bearing rotatably supports a crankshaft 36, which includes a splined surface 38 for drivably connecting the crankshaft to the sheave of a drivebelt assembly, a cylindrical shoulder 40 fitted within the bearing concentric with axis A—A, eccentric 42 having a cylindrical surface whose axis B—B is offset radially from axis A-A, and a large cylindrical surface coaxial with A—A.

An orbiting ring 46 includes a cylindrical outer surface 48 coaxial with B—B, a cylindrical boss joined by a web to the outer surface defines a central bore 54 concentric with axis B—B. Bushing 56 is fitted within bore 54 and rotatably supports eccentric 42 on the orbiting ring. Other types of bearings are also possible for rotatably and axially supporting the crankshaft and the orbiting ring.

The compressor also includes a center housing 12 having a cylindrical inner surface 58 on which the outer cylindrical surface 48 of the orbiting ring rolls, a suction passage 62 through which incoming low pressure gas flows, and outer vane slots 64, 66 in which vanes 74, 76 slide into contact with the outer surface of the orbiting ring. Inlet passages 68, 70, communicating respectively with passages 62, 63, carry refrigerant at suction pressure to inlet pockets 72, 73 formed on the lateral, inner faces of the outer vanes 74, 76, respectively.

The rear plate 14 of the compressor includes a post 78 having an outer cylindrical surface 80 coaxial with axis A—A, sized to fit within the orbiting ring and located within center housing 12. The post contains a transverse diametric slot 82, within which internal vanes 84, 86 are mounted for sliding radially directed movement into contact with the inner surface of the orbiting ring. The rear plate also includes a suction passage 88 aligned with passage 62, first stage-discharge passages 90, 92, intermediate or second-stage inlet passages 94, 96, and second stage discharge passages 98, 100.

A valve plate 102, formed of spring steel, seats within a circular recess formed on the rear face of head 14 and defines four reed valves: first and second first stage discharge valves 104, 106 for opening and closing passages 90, 92; and first and second second stage discharge valves 108, 110 for opening and closing passages 98, 100. The reed valves operate on the basis of pressure difference across the valves to open and close corresponding passages. The valves open by bending valve tabs 104, 106, 108, 110 through their thicknesses of the spring steel sheet. As the pressure difference across the valve declines, the degree to which the corresponding passages are opened by the valve decreases due to resilience of the steel sheet and its tendency to close the corresponding passage when the pressure difference is removed.

Located between the adjacent faces of the rear head and rear plate, gasket 16 seals the periphery of the four tension bolt holes, and two dowel holes and the passages opened and closed by the four reed valves, viz. the intermediate pressure passage and inlet or suction passages.

The rear head 18 also includes a suction port 112, a suction passage (not shown) aligned and communicating with suction passage 88 and 62, and discharge port 116 communicating with the interior waist of the cylinder integrally cast with the body of the rear head. As fully explained in the '368 patent, the disclosure of which is hereby incorporated by reference, first stage discharge pressure gas flows through passages defined by the waist of cylinder. These passages are aligned with intermediate pressure passages 94, 96 formed through the thickness of rear plate 14 and the length of post 78, through which gas compressed in the first stage is carried to and enters the second stage. The interior volume of cylinder 118 is divided by the baffle into two portions, each portion communicating with second stage discharge passages 98, 100. The slots in the baffle provide means for passages 98, 100 to maintain communication with discharge port 116 through which gas at discharge pressure leaves the compressor as is more fully explained in the '368 patent.

Figure 2:
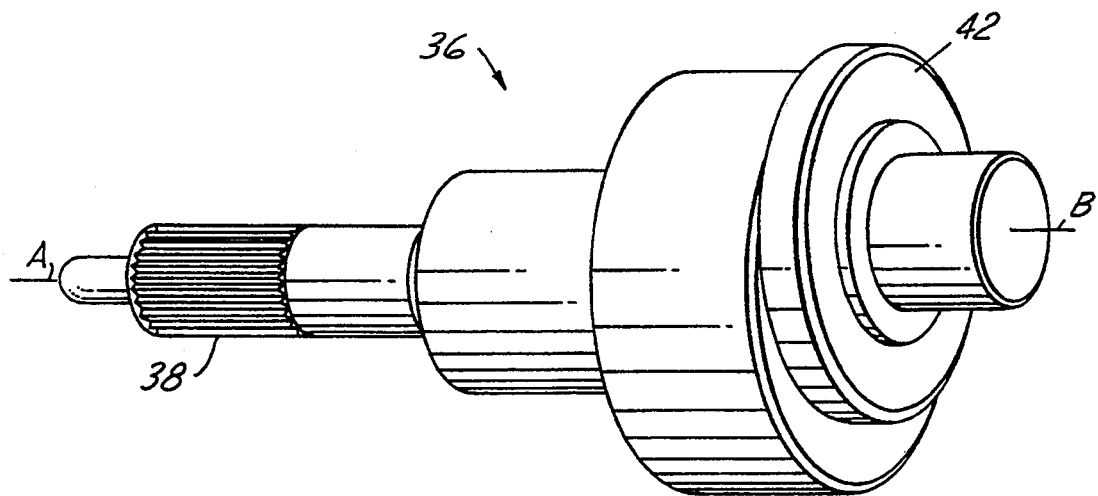
FIG. 2 is a perspective view of a clutch apparatus of the present invention.
Figure 3A:
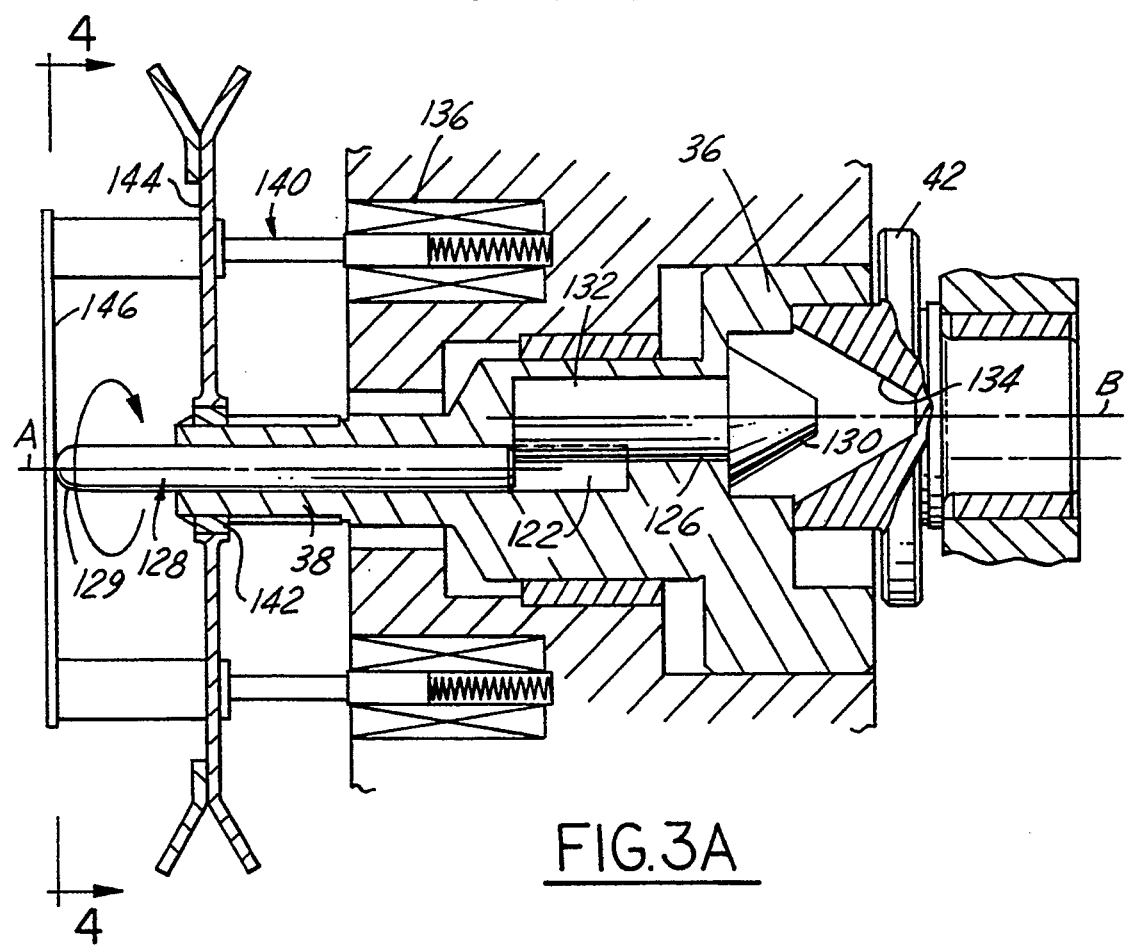
FIGS. 3A-C are cross-sectional views of the clutch apparatus of FIG. 2 in various stages of operation in accordance with the principles of the present invention.

Referring now to FIGS. 2 and 3A, the clutch assembly of the present invention includes crankshaft 36 having a splined or keyed surface 38 at one end thereof which is drivably engageable with the vehicle engine such as through a pulley and endless belt arrangement as is known in the art. The crankshaft 36 includes a generally cylindrical bore 122 disposed therethrough which terminates in a chamber 124 at an end of the crankshaft opposite the splined surface end. The chamber is a generally cylindrical area which houses the eccentric 42 therein. The eccentric 42 can move axially within the chamber either due to gas compression in the orbiting ring component of the compressor or due to other vibratory motions of the compressor. As can be seen, the axis of rotation of the eccentric, B—B is offset from the axis of rotation of the crankshaft (A—A).

Disposed within the cylindrical bore 122 of the crankshaft 36 is a plunger 126 and a secondary shaft 128. The secondary shaft 128 has a terminating end 129 which extends a predetermined distance from the terminating end of the splined surface portion of the crankshaft when the secondary shaft is in the position indicated in FIG. 3A. This is a position of non-engagement such that the crankshaft 36 rotates freely relative to the eccentric 42 and transmits no torque therebetween. The plunger 126 includes a head portion 130 and a shaft portion 132. The shaft portion 132 contacts the secondary shaft 128 upon actuation of the clutch assembly. The head portion 130 of the plunger 126 is frusto-conical-shaped and configured to matingly engage a frusto-conical-shaped blind bore 134 in the eccentric 42. The benefits of this shape will be described in greater detail below.

The clutch assembly further includes means for axially reciprocating the plunger shaft in the crankshaft to cause engagement of the plunger head 130 into the eccentric blind bore 134. In the embodiment shown in FIGS. 3A-C, the means includes a coil of current carrying wire 136 circumferentially surrounding the crankshaft 36, into which a generally cylindrical linkage assembly 140 projects. As shown in FIG. 4, the coil assembly 136 includes a fixed inner coil 137 and a fixed outer coil 139 which define a gap 141 therebetween. The linkage assembly 140 is disposed in gap 141 and interconnects the coil assembly with a terminating end 129 of the secondary shaft 128 disposed within the cylindrical bore 122 of the crankshaft 36. The linkage assembly is connected to the pulley 144 which in turn is connected to the crankshaft at 142 in a known manner. The linkage 140 also includes a plate member 146 which connects the terminating end 129 of the secondary shaft to the coil assembly 136. The coil assembly 136 is electrically connected to an electric power source, such as the vehicle battery 138 such that upon energization of the coil assembly 136, the linkage assembly is pulled into the coil assembly and thereby forcing the secondary shaft 128 into the cylindrical bore 122 of the crankshaft 36. When a current is not applied to the coil assembly 136, the crankshaft 36, pulley 144 and linkage assembly 140 rotate freely relative to the eccentric.

Figure 3B:
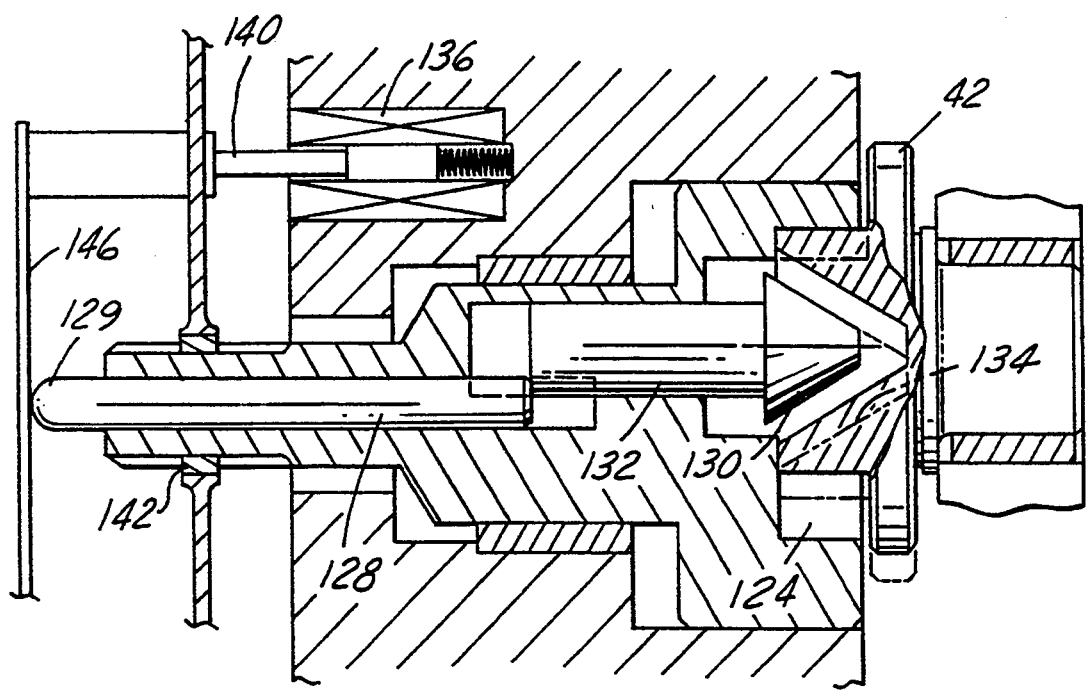
Figure 3C:
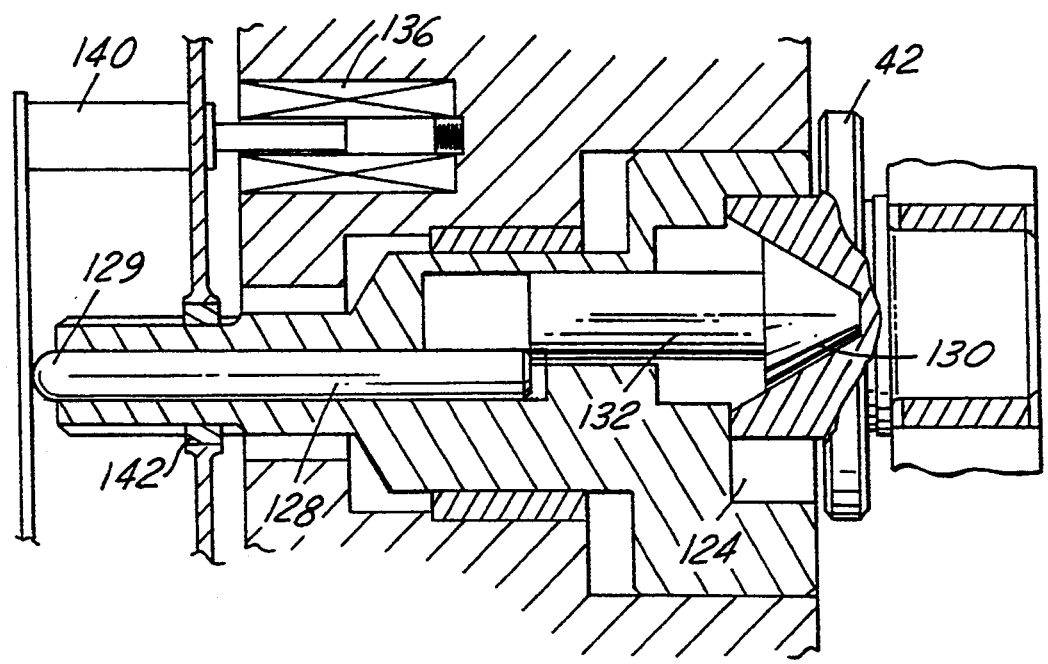
Figure 4:
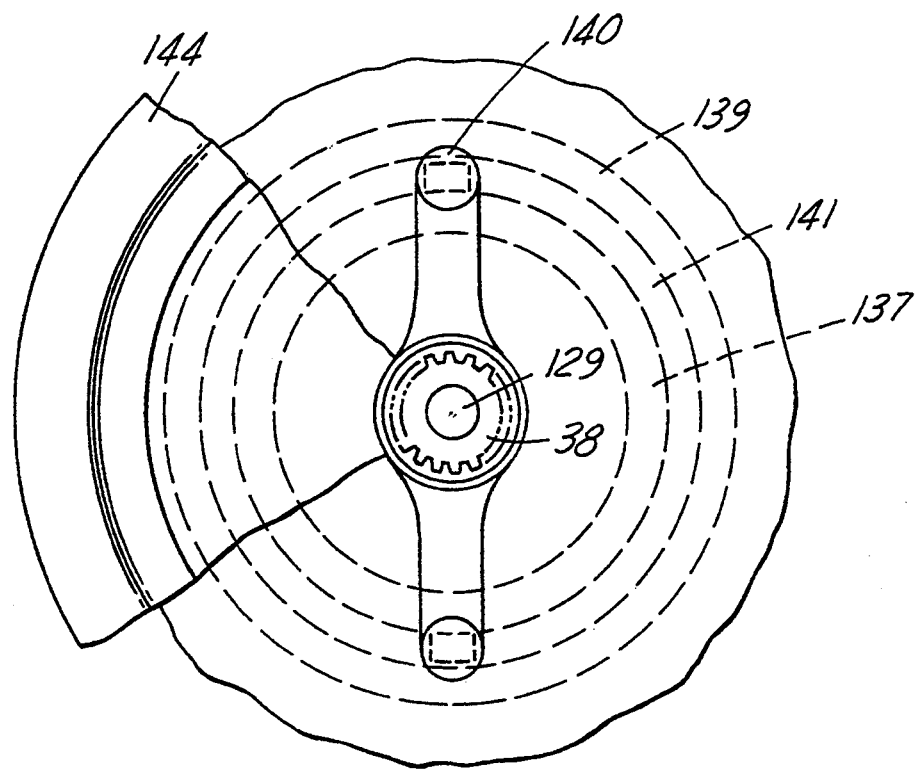
FIG. 4 is a cross-sectional view taken along line 4—4 of FIG. 3A.

FIGS. 3A-C show the progressive steps of the engagement of the clutch assembly to transmit torque from the vehicle engine to the eccentric to cause rotation of the ring and subsequent compression of the gas within the compressor. FIG. A shows non-engagement of the clutch assembly relative to the eccentric 42. During the operation of the vehicle, when the compressor is not engaged, the eccentric 42 may shift axially within the chamber 124 due to gas pressure developed in the compressor such that the axis of rotation of the eccentric 42 (B—B) moves axially closer to the axis of rotation of the crankshaft (A—A). When air conditioning is needed within the vehicle, and the operation of the compressor is necessary, the power source 138 sends an electrical signal to coil 136 to energize the clutch assembly. Upon energization of the coil, the linkage assembly pushes the secondary shaft 128 into engagement with the shaft portion 132 of the plunger 126. As shown in FIG. 3B, the frusto-conical surface of the head portion 130 of the plunger contacts a side of the blind bore 134 of the eccentric and because of the ramped mating surfaces between the plunger head portion and the blind bore, the eccentric is forced into its design position as the plunger 126 is forced further into the blind bore 134. As shown in FIG. 3C, the plunger head portion 130 is fully engaged into the blind bore 134 of the eccentric and torque can now be transmitted from the crankshaft 36 to the eccentric 42 for operation of the compressor to compress the gas as has been described above. Appropriate seals may be placed between the moving portions of the clutch assembly to prevent leakage of gas therethrough.

Figure 5:
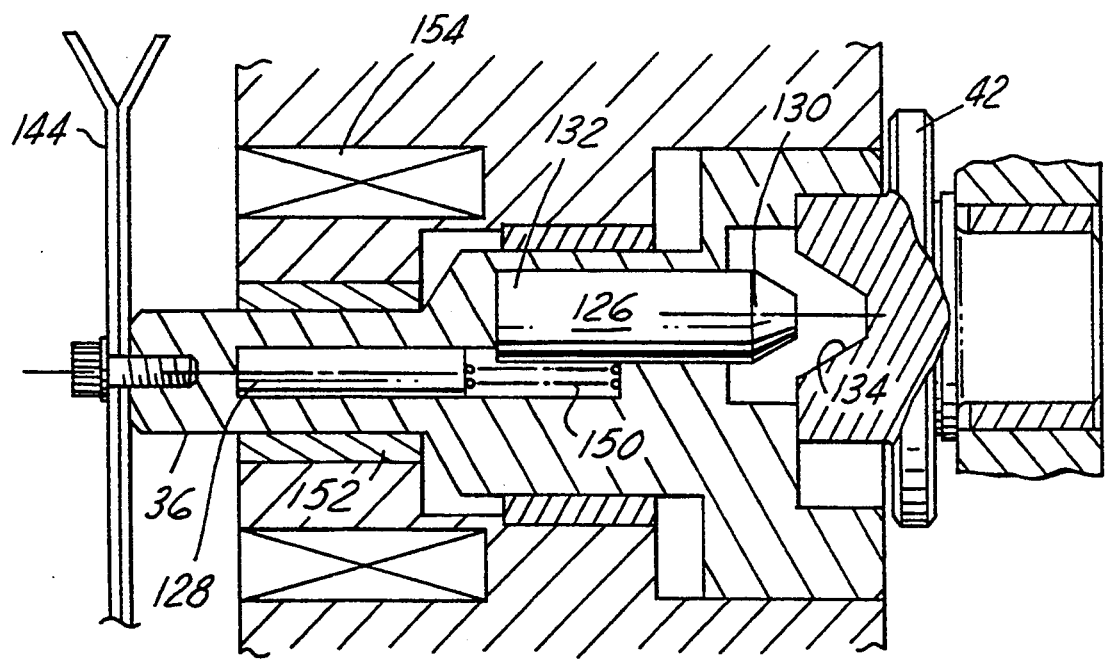
FIG. 5 is a cross-sectional view of an alternative embodiment of the present invention.

FIG. 5 shows an alternative embodiment of the clutch apparatus of the present invention. In FIG. 5 like elements will be given like reference numerals. In this embodiment, the coil of current carrying wire 154 circumferentially surrounds the crankshaft 36 of the clutch apparatus. The plunger 126 and/or secondary shaft 128 are made from a magnetically responsive material such that energization of the wound wire coil causes the secondary shaft to engage the plunger (or the plunger itself if no secondary shaft is provided) to engage the frusto-conical shaped blind bore 134 in the eccentric. When current is interrupted to the wire coil, a return spring 150 and/or eccentric reaction forces causes the plunger 126 to retract into the crankshaft and the eccentric moves in the chamber 124 resulting in no load transmission through the shaft. A bearing member 152 is circumferentially disposed between the wound coil wire 136 and the crankshaft 36.

Various other modifications and alterations of the present invention will no doubt occur to those skilled in the art. For example, the pulley utilized for interconnecting the vehicle engine to the crankshaft could be sized smaller for better packaging such that the pulley would be disposed interior of the linkage assembly. The linkage assembly and coil assembly could be fixed relative to the rotating crankshaft such as to a portion of the compressor housing to reduce the number of rotating members within the compressor. Furthermore, it is contemplated that other means may be utilized to actuate the plunger into the eccentric. These include hydraulic pressure, gas pressure, cam actuation or direct mechanical actuation. Also, the shape of the plunger head may take any number of shapes known in the art. Those skilled in the art, in view of the present disclosure, will appreciate that numerous other alternative embodiments of the invention are within the scope of the following claims.

We claim:

1. A clutch apparatus for a compressor of an air conditioning system in an automotive vehicle, comprising:
   a crankshaft drivably connected to a power source at one end thereof and defining a chamber at an opposite end thereof;
   an eccentric operative to engage an orbiting ring within said compressor so as to cause rotation of said ring, said eccentric being rotatable relative to said crankshaft and being slidably received in said chamber of said crankshaft, said eccentric defining a blind bore of predetermined shape at one end thereof;
   a plunger disposed within said crankshaft, said plunger including a head portion and a shaft portion, said head portion being disposed in said chamber and configured to be matingly engageable with said bore in said eccentric, said plunger shaft portion being axially reciprocal in said crankshaft; and
   means for axially reciprocating said plunger shaft portion in said crankshaft so as to cause engagement and disengagement of said plunger head portion into said blind bore, whereby said crankshaft transmits torque to said eccentric to rotate said orbiting ring upon engagement of said head portion into said blind bore upon actuation of said means and said crankshaft rotates freely relative to said eccentric upon de-actuation of said means.

2. A clutch apparatus according to claim 1, wherein said means for axially reciprocating said plunger shaft portion further includes a coil of current-carrying wire electrically connected to an electrical power source such that under a current from said electrical power source, said means causes said plunger head to axially move relative to said crankshaft to engage said blind bore of said eccentric.

3. A clutch apparatus according to claim 2, wherein said plunger shaft portion is fabricated from a magnetic responsive material and operative to move axially within said crankshaft upon a current from said electrical power source.

4. A clutch apparatus according to claim 2, wherein said means further includes a linkage operatively connecting said coil of current-carrying wire to said plunger shaft portion, said linkage including a secondary shaft disposed in said crankshaft such that one end of said secondary shaft contacts said plunger shaft and the opposite end of said secondary shaft is connected to said coil.

5. A clutch apparatus according to claim 4, wherein said coil of current carrying wire includes a fixed inner coil and a fixed outer coil surrounding to said crankshaft and defining a gap therebetween, such that one end of said linkage assembly is disposed in said gap.

6. A clutch apparatus according to claim 5, wherein said linkage further includes a generally cylindrical member disposed in said gap, said cylindrical member being connected to one end of said secondary shaft by a plate member.

7. A clutch apparatus for a rotary compressor of an air conditioning system in an automotive vehicle, comprising:
   a crankshaft drivably connected to a power source at one end thereof and defining a chamber at an opposite end thereof;
   an eccentric operative to engage an orbiting ring within said compressor so as to cause rotation of said ring, said eccentric being rotatable relative to said crankshaft and being slidably received in said chamber of said crankshaft, said eccentric defining a blind bore of predetermined shape at one end thereof;
   a plunger disposed within said crankshaft, said plunger including a head portion and a shaft portion, said head portion being disposed in said chamber and configured to be matingly engageable with said bore in said eccentric, said shaft portion being axially reciprocal in said crankshaft; and
   a coil of current-carrying wire electrically connected to an electrical power source such that under a current from said electrical power source, said plunger head axially moves relative to said crankshaft to engage said blind bore of said eccentric, whereby said crankshaft transmits torque to said eccentric to rotate said orbiting ring upon engagement of said head portion into said blind bore upon actuation of said coil and said crankshaft rotates freely relative to said eccentric upon de-actuation of said coil.

8. A clutch apparatus according to claim 7, further including a linkage operatively connecting said coil of current-carrying wire to said plunger shaft portion, said linkage including a secondary shaft disposed in said crankshaft such that one end of said secondary shaft contacts said plunger shaft and the opposite end of said secondary shaft is connected to said coil.

9. A rotary compressor for an air conditioning system of an automotive vehicle having a source of power, said compressor comprising:
   a housing fixed against rotation, defining an interior surface having a first axis;
   a post substantially coaxial with the first axis, located within, and spaced radially from, the interior surface of the housing;
   a ring mounted for rotation about an axis radially displaced from the first axis, located within the housing between its interior surface and the post, having a first surface generally spaced from and locally contacting the interior surface of the housing at a first location of contact, and a second surface generally spaced from and locally contacting the post at a second location of contact;
   outer vanes contacting the first surface of the ring at angularly spaced locations, dividing a first space bounded by the interior surface of the housing and the first surface of the ring into first and second chambers;
   inner vanes contacting the second surface of the ring at angularly spaced locations, dividing a second space bounded by the post and the second surface of the ring into third and fourth chambers;
   passage means for carrying fluid no and from the first and second spaces, said passage means including means for carrying fluid from said first space to an intermediate pressure chamber;
   valve means for opening and closing communication between the passage means and the first amid second spaces; and
   clutch means for selectively transmitting torque from said vehicle power source to said ring, said clutch means comprising:
      a crankshaft drivably connected to said power source at one end thereof and defining a chamber at an opposite end thereof;
      an eccentric operative to engage said ring within said compressor so as to cause rotation of said ring, said eccentric being rotatable relative to said crankshaft and being slidably received in said chamber of said crankshaft, said eccentric defining a blind bore of predetermined shape at one end thereof;
      a plunger disposed within said crankshaft, said plunger including a head portion and a shaft portion, said head portion being disposed in said chamber and configured to be matingly engageable with said bore in said eccentric, said shaft portion being axially reciprocal in said crankshaft; and
      a coil of current-carrying wire electrically connected to an electrical power source such that under a current from said electrical power source, said plunger head axially moves relative to said crankshaft to engage said blind bore of said eccentric, whereby said crankshaft transmits torque to said eccentric to rotate said ring upon engagement of said head portion into said blind bore upon actuation of said coil and said crankshaft rotates freely relative to said eccentric upon de-actuation of said coil.

10. A clutch apparatus according to claim 7, further including a linkage operatively connecting said coil of current-carrying wire to said plunger shaft portion, said linkage including a secondary shaft disposed in said crankshaft such that one end of said secondary shaft contacts said plunger shaft and the opposite end of said secondary shaft is connected to said coil.

* * * * *